United States Patent [19]

Bischoff et al.

[11] Patent Number: 5,295,246
[45] Date of Patent: Mar. 15, 1994

[54] BIDIRECTIONAL FIFO BUFFER FOR INTERFACING BETWEEN TWO BUSES OF A MULTITASKING SYSTEM

[75] Inventors: Gary Bischoff; Paul J. Milot, both of Saugerties; Marc Segre, Rhinebeck; Jeffrey S. Spencer, Lake Katrine; Leslie R. Wilson, Clinton Corners, all of N.Y.

[73] Assignee: International Business Machines Corporation, Armonk, N.Y.

[21] Appl. No.: 91,075

[22] Filed: Jul. 13, 1993

Related U.S. Application Data

[63] Continuation of Ser. No. 621,128, Nov. 30, 1990, abandoned.

[51] Int. Cl.$^5$ .............................................. G06F 13/00
[52] U.S. Cl. ................................................................ 395/250
[58] Field of Search ................... 395/200, 250, 275; 370/60, 94.1

[56] References Cited

U.S. PATENT DOCUMENTS

| | | | |
|---|---|---|---|
| 3,601,809 | 8/1971 | Gray et al. | 340/172.5 |
| 4,062,059 | 12/1977 | Suzuki et al. | 364/200 |
| 4,258,418 | 3/1981 | Heath | 364/200 |
| 4,285,038 | 8/1981 | Suzuki et al. | 364/200 |
| 4,454,595 | 6/1984 | Cage | 364/900 |
| 4,607,328 | 8/1986 | Furukawa et al. | 364/200 |
| 4,750,107 | 6/1988 | Buggert | 364/200 |
| 4,809,269 | 2/1989 | Gulick | 370/85.2 |
| 4,823,312 | 4/1989 | Michael et al. | 364/900 |
| 4,839,791 | 6/1989 | Ito | 364/200 |
| 4,847,812 | 7/1989 | Lodhi | 365/221 |
| 4,866,597 | 9/1989 | Kinoshita | 395/250 |
| 4,888,727 | 12/1989 | Getson, Jr. et al. | 364/200 |
| 4,920,480 | 4/1990 | Murakami et al. | 364/200 |
| 4,942,515 | 7/1990 | Marzucco et al. | 364/200 |
| 4,942,553 | 7/1990 | Dalrymple et al. | 364/900 |

FOREIGN PATENT DOCUMENTS

| | | | |
|---|---|---|---|
| 0303288 | 8/1988 | European Pat. Off. . | |
| 0285334 | 10/1988 | European Pat. Off. | H04Q 11/04 |
| 0290172 | 11/1988 | European Pat. Off. | G06F 5/06 |
| 0315209 | 5/1989 | European Pat. Off. | G06F 12/14 |
| 0365116 | 4/1990 | European Pat. Off. | G06F 13/12 |
| 5513281 | 11/1981 | Japan . | |

OTHER PUBLICATIONS

Akeley et al., "High-Performance Polygon Rendering", Aug. 1988, pp. 239–246.
*IBM Technical Disclosure Bulletin*, vol. 32, No. 9A, Feb. 1990, "Paralleling Links in a Unified Switching Architecture for Circuit/Packet Switching", pp. 45–49.
*Research Disclosure*, Feb. 1988, No. 28609, "Control of a Bi-Directional Data Cache Using a Single Buffer Counter".

*Primary Examiner*—Robert L. Richardson
*Attorney, Agent, or Firm*—Mark S. Walker; William A. Kinnaman, Jr.

[57] ABSTRACT

Data transfers between a workstation bus and a graphics adapter bus are handled by a plurality of first-in-first-out (FIFO) buffers, each of which is independently operable to transfer data in a selected direction between the two buses. The FIFOs are accessible either directly by the workstation processor or by means of a DMA operation. Each FIFO is assigned a unique range of addresses in the address space of the workstation processor to permit a workstation process to transfer a block of data to or from a selected FIFO using a single instruction. Workstation writes (reads) to a FIFO are suspended in response to a first status signal indicating that the high (low) threshold for that FIFO has been reached and are restarted in response to a second status signal indicating that the low (high) threshold has been reached. A buffer counter indicating the amount of data in each FIFO is initialized at zero for outbound transfers from the workstation to the adapter or at the maximum buffer count for inbound transfers from the adapter to the workstation. The buffer count is incremented in response to accesses from the workstation side and is decremented in response to accesses from the adapter side, regardless of the direction of transfer.

14 Claims, 6 Drawing Sheets

BIDIRECTIONAL FIFO BUFFER FOR INTERFACING BETWEEN TWO BUSES OF A MULTITASKING SYSTEM

This is a continuation of application Ser. No. 07/621,128 filed Nov. 30, 1990, now abandoned.

BACKGROUND OF THE INVENTION

1. Field of the Invention

This invention relates to a FIFO buffer for interfacing between two system buses and, more particularly, to a buffer for interfacing between an I/O bus of a computer workstation and an internal bus of a graphics adapter.

2. Description of the Related Art

Data or information in computers is processed in a predominantly serial fashion. Many times there are sources and destinations of data that are connected by buses. Usually there is a mismatch in the rate at which data is produced and the rate at which is can be accepted. The data is therefore stored in a first-in-first-out (FIFO) buffer between the data source and data destination to accommodate any mismatches between the rate at which the data source can generate the data and the rate at which the data destination can process it.

One such application for a FIFO buffer is for interfacing between the I/O system bus of a computer or workstation and the internal bus of a graphics adapter coupled to a display device. The buffering requirements are complicated by the fact that, typically, several processes are running concurrently on the workstation processor, each of which may have to access the graphics adapter. Also, in many systems, read access as well as write access to the graphics adapter is required. What is desired, therefore, is a FIFO buffer that can transfer data bidirectionally and can accommodate several processes running simultaneously on the workstation processor.

SUMMARY OF THE INVENTION

In accordance with the present invention there is provided a FIFO interface for interfacing between a first bus coupled to one or more processors, such as those associated with the central processor and system bus of a workstation, and a second bus also coupled to one or more processors such as those of a graphics adapter. The FIFO interface comprises a plurality of FIFO buffers coupled in parallel between the two buses, with each FIFO being addressable over a range of addresses to facilitate block transfers. Each FIFO is capable of data transfer in either direction from the buses, in accordance with a transfer direction bit which can be written to from the buses, and is operable independently of the other FIFOs to permit data transfer by multiple applications running concurrently.

Threshold crossings are used to pace (i.e. suspend and resume) processes accessing a buffer to minimize the software overhead required to avoid overrun or underrun. Thus, a process accessing a buffer is suspended in response to a buffer count (also referred to the the in-use count) crossing a first threshold (high threshold for a write and low threshold for a read) and is not resumed until the buffer count crosses a second threshold (low threshold for a write and high threshold for a read). DMA accesses are suspended and resumed in this manner by a DMA suspend signal sent to the DMA controller.

Accesses by processes running on the workstation central processor are controlled by an interrupt handler responding to threshold interrupts. As one interrupt is generated the corresponding threshold is disabled and the other threshold enabled, so that a process accessing the FIFO is alternately suspended and resumed in response to high and low (or low and high if reading to the buffer) interrupts.

These suspensions and resumptions are transparent to the process accessing the FIFO, which does not have to monitor the availability of buffer storage space but can simply assume that such space exists. Suspending the process while the buffer count progresses from the first threshold to the second threshold minimizes the thrashing that might occur when the buffer count continually crosses and then recrosses the same threshold. Preferably the threshold counts are stored in registers which, together with the buffer count register and interrupt enable registers, may be accessed from the buses to alter the register contents. This permits a first process to control a second process in a manner that is transparent to the controlled process simply by making suitable writes to the registers.

Preferably, each buffer in-use counter is always incremented after accesses from the first bus and decremented after access from the second bus, regardless of the direction of data transfer, to minimize hardware complexity. The in-use counter thus indicates the number of filled buffer locations for one direction of data transfer (e.g. from the workstation to the graphics adapter) and the number of empty buffer locations for the other. To account for this varying significance of the buffer count, the threshold register contents and comparison operations are adjusted accordingly.

DESCRIPTION OF THE PREFERRED EMBODIMENT

Figure 1:
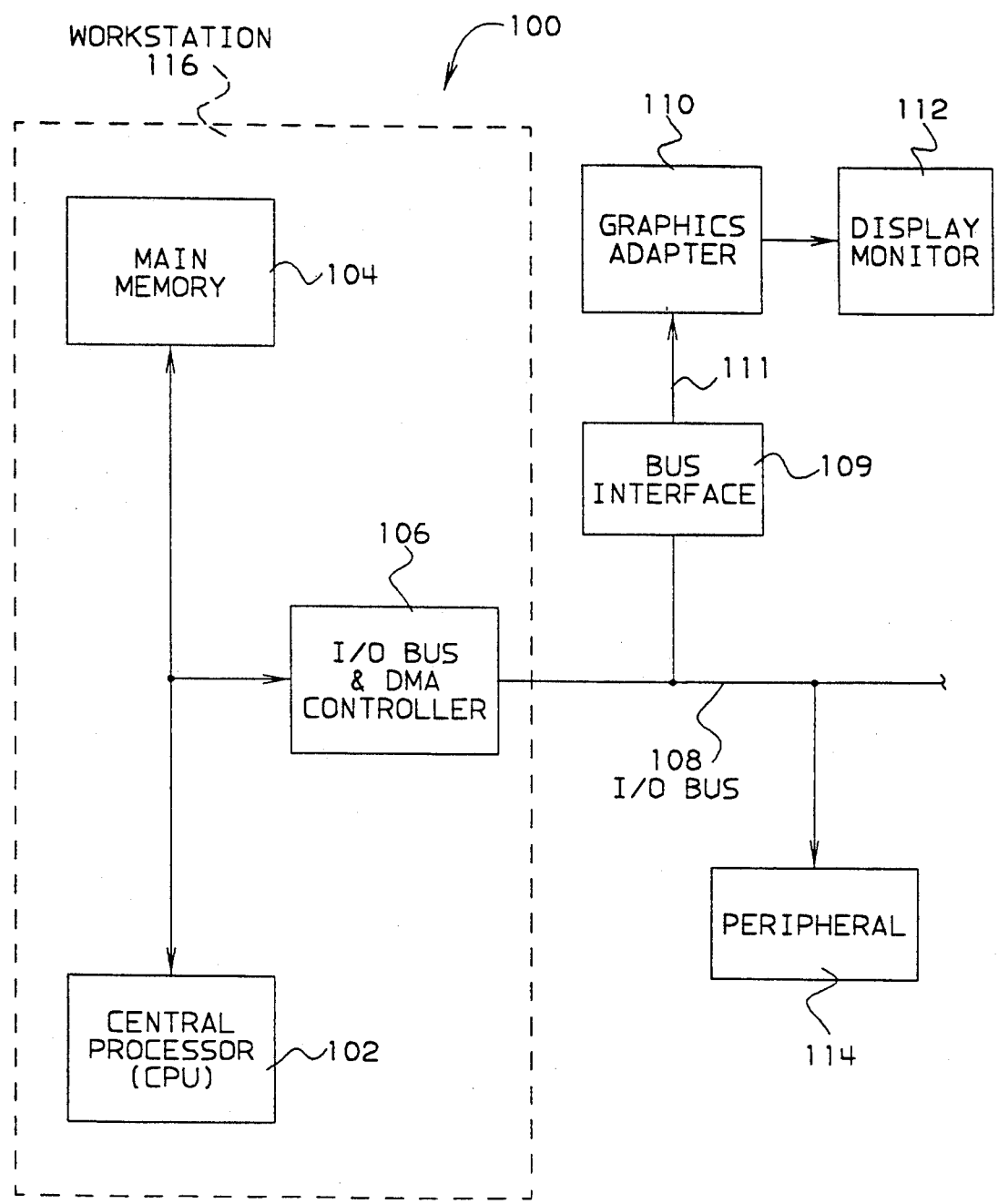
FIG. 1 is a schematic diagram of a computer system incorporating a FIFO buffer constructed in accordance with our invention.

Referring first to FIG. 1, a system 100 incorporating our invention includes a central processing unit (CPU) or processor 102 coupled to main memory 104 directly and to an input/output (I/O) bus 108 through an I/O bus and direct memory access (DMA) controller 106. A bus interface 109 couples I/O bus 108 via line 111 to a graphics adapter 110, which is in turn coupled to a display monitor 112 of any suitable type known to the art. I/O bus 108 also couples controller 106 to one or more other peripherals, indicated generally by the rectangular box 114. These peripherals may include such standard devices as a keyboard, alternative input devices such as a mouse, a printer, secondary storage such as a magnetic or optical disk drive, or the like. Although the present invention is not limited to any particular system 100, an exemplary system would be a high-performance workstation such as the IBM RISC System/6000 (trademark) computer, using a Micro Channel (trademark) bus for I/O bus 108. For convenience in this specification, central processor 102, main memory 104 and I/O bus and DMA controller 106 will sometimes be collectively referred to as the workstation 116, as distinguished from such peripherals connected to the I/O bus 108 as the graphics adapter 110. Further, to distinguish processor 102, memory 104 and bus 108 from similar components of the graphics adapter 110, these workstation components will sometimes be referred to as the workstation processor 102, workstation memory 104 and workstation bus 108, respectively.

Figure 2:
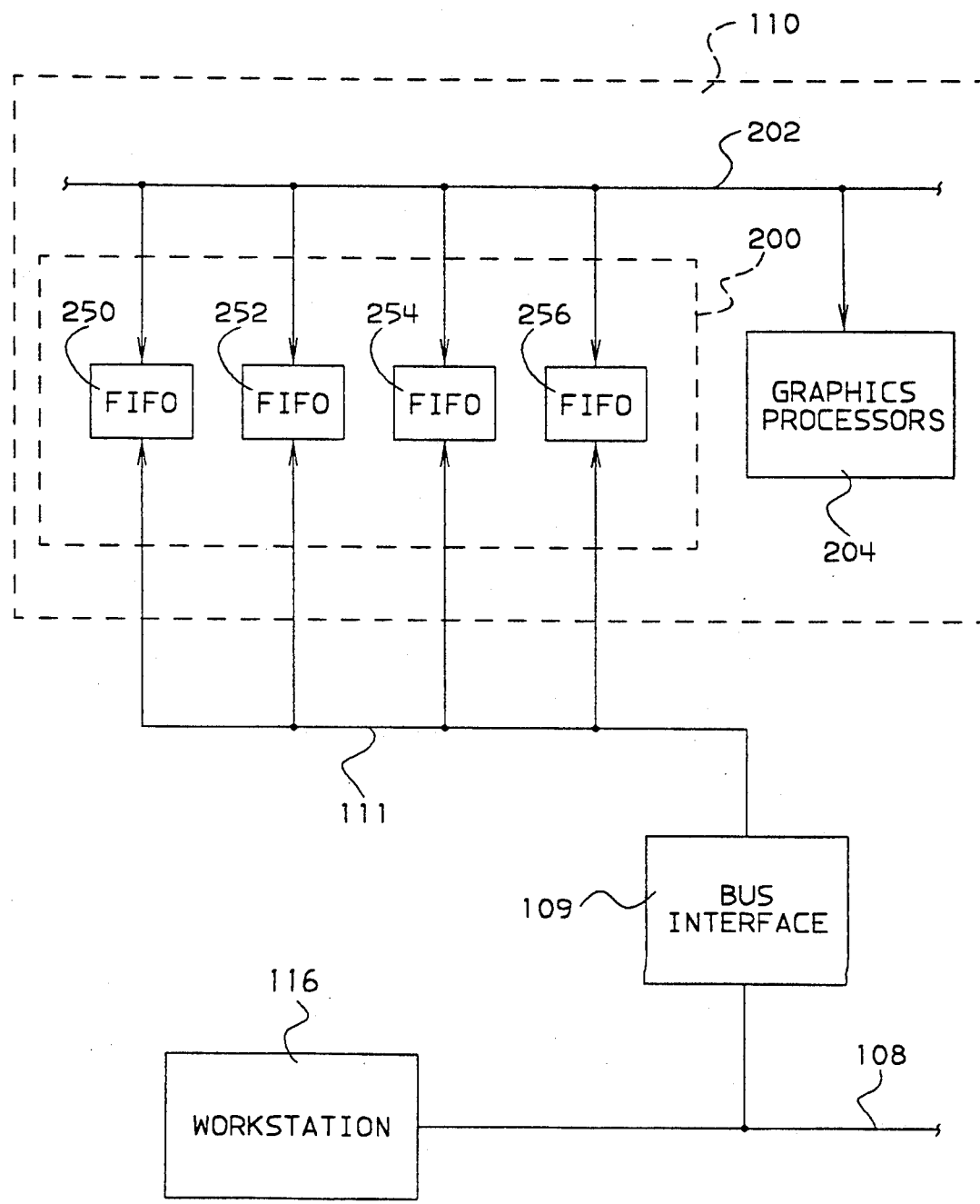
FIG. 2 is a schematic diagram of the FIFO interface of our invention as it appears to the units to which it is attached.

Graphics adapter 110 runs asynchronously relative to workstation 116. Referring now to FIG. 2, graphics adapter 110 includes an internal adapter bus 202, which is connected to the bus interface 109 and hence to workstation bus 108 by way of a FIFO interface 200. As shown in FIG. 2, FIFO interface 200 may be conceptually regarded as consisting of four FIFOs, FIFOs 250, 252, 254 and 256, coupled in parallel between bus interface 109 and the adapter bus 202. As will be described below, FIFOs 250-256 may be used concurrently, to transfer data in a selected direction for each FIFO between workstation 116 and graphics adapter 110. Also coupled to adapter bus 202, as shown in FIG. 2, are one or more graphics processors indicated generally by the rectangle 204. Graphics adapter 110 additionally includes such standard components as a frame buffer (not shown) for storing a bit map of the image to be displayed on the monitor 112. These and similar components of the adapter 110 are not as such relevant to the present invention, however, and therefore have not been shown.

Figure 3:
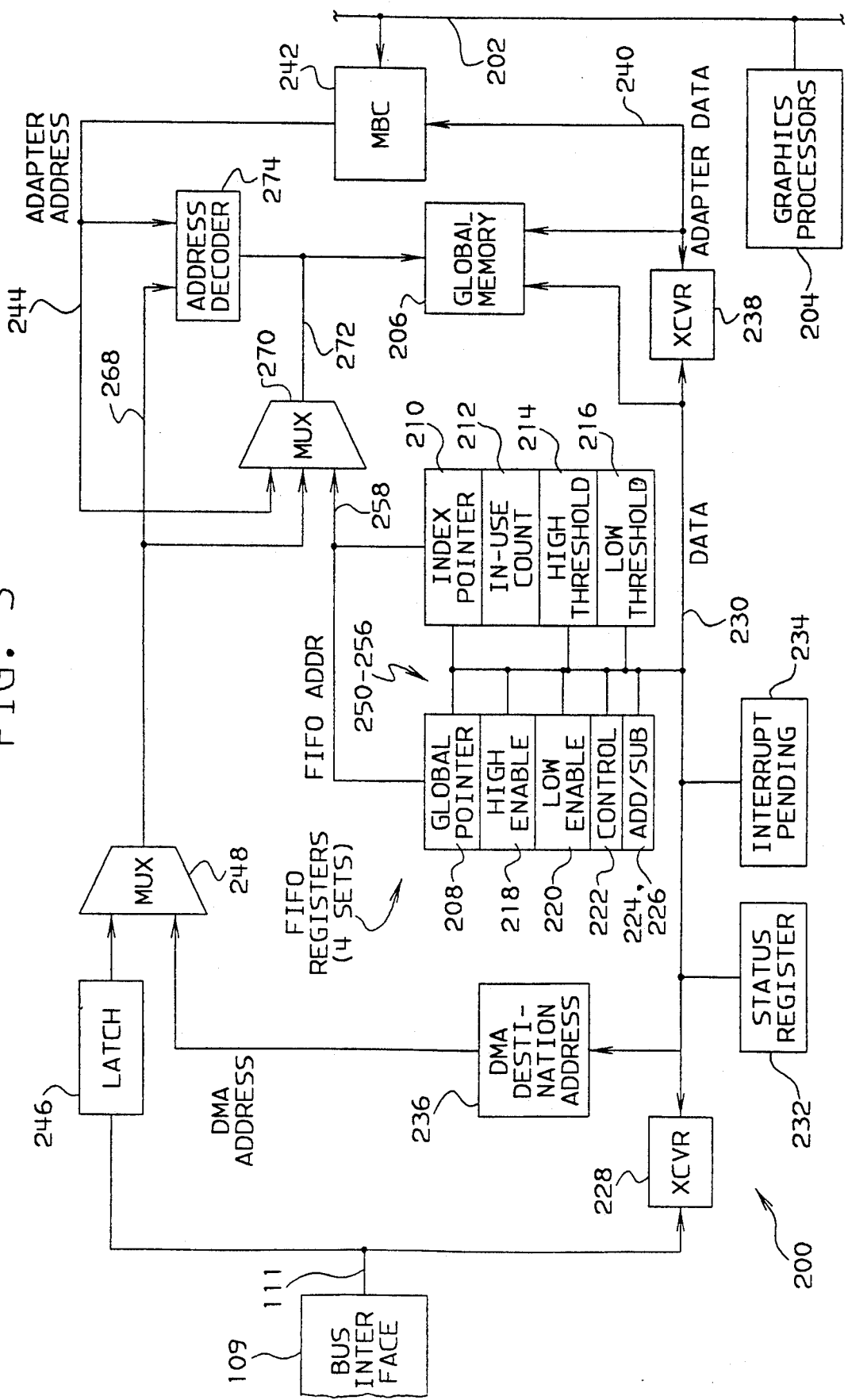
FIG. 3 is a schematic diagram of the internal structure of the FIFO interface shown in FIG. 3.

Referring now to FIG. 3, line 111 from bus interface 109 alternately contains data and address information, which is multiplexed to minimize the number of parallel conductors. A transceiver 228 coupled to bus interface line 111 and FIFO interface data line 230 controls the transfer of data between the two lines. (For convenience herein, elements such as lines 111 and 230 will be referred to in the singular, even though they may in fact contain a number of conductors in parallel.) Data line 230 is coupled to various components of the FIFO interface 200, including a status register 232, an interrupt pending register 234 and a DMA destination address register 236.

Status register 232 stores information indicating the status (e.g. high threshold reached, low threshold reached) of each of FIFOs 250-256, while interrupt pending register 234 stores information indicating whether an interrupt from a particular FIFO is currently pending. Status register 232 stores two bits for each FIFO, one for the high threshold and one for the low threshold. Each status bit is set to 1 whenever the corresponding threshold is crossed in one direction (from below for the high threshold and from above for the low threshold) and is reset to zero whenever the same threshold is recrossed in the opposite direction.

Interrupt pending register 234 also stores two bits for each FIFO, one for each threshold. Each bit is set to 1 concurrently with the generation of an interrupt signal for the corresponding FIFO and threshold to indicate that an interrupt is pending and is reset to 0 when read by the workstation processor 102 (more particularly, by the interrupt handler running on the processor).

DMA destination address register 236 stores a DMA address, which is used in an alternative mode of operation described below. A second transceiver 238 interconnects data line 230 with an adapter data line 240 originating from a bus controller (MBC in FIG. 3) 242 coupled to graphics adapter bus 202. Bus controller 242 also provides address information from adapter bus 202 on a separate adapter address line 244.

A latch 246 responsive to line 111 from bus interface 109 supplies address information from line 111 (and thus ultimately from workstation 116) to one input of a multiplexer 248. DMA destination address register 236 provides the other input to multiplexer 248. Multiplexer 248 is suitably actuated to provide either the DMA address from register 236 or the workstation address signal from line 111 on an output line 268. The address signal selected by multiplexer 248 is supplied to one input of a multiplexer 270. Multiplexer 270 receives a second input from adapter address line 244 as well as a third address input from a FIFO address line 258, to be described below. Multiplexer 270 provides an output on line 272. Line 272 is also coupled to the output of an address decoder 274 that receives inputs from line 268 coupled to multiplexer 248 and from line 244 coupled to bus controller 242.

FIFO interface 200 includes a global memory 206, which is preferably implemented by means of a video RAM (VRAM). Global memory 206 receives an address input from address line 272, has a parallel data port coupled to data line 230 and has a serial data port coupled to adapter data line 240. Depending on the mode of operation global memory 206 may receive, via multiplexer 270, a DMA destination address from register 236 through multiplexer 248, a workstation address from latch 246 through multiplexer 248, a FIFO address from line 258 or an adapter address from line 244. Alternatively, global memory 206 may receive an address from decoder 274 that is decoded from the adapter address on line 244 or the workstation or DMA address on line 268. Data may be written to or read from global memory 206 via either the parallel port coupled to data line 230 or the serial port coupled to adapter data line 240. This provision of dual ports allows data to be simultaneously written to and read from global memory 206.

FIFOs 250-256 are implemented by means of four sets of FIFO registers 208-226, with one set of registers for each FIFO. These registers include, for each FIFO, a global pointer register 208, an index pointer register 210, an in-use count register 212, high and low threshold registers 214 and 216, high and low threshold enable registers 218 and 220, control register 222, and add and subtract registers 224 and 226.

Global pointer register 208 stores the starting address of a 64K block in global memory reserved for the particular FIFO. Each FIFO can be located on any 64K byte boundary in global memory 206. The value stored in register 208 corresponds to the six most significant bits of the memory address (i.e. A21-A16). Typically, FIFOs 250-256 may be set up to occupy the top 256K of global memory 206.

Index pointer register 210 contains the address offset within each FIFO for the next access from the workstation 116. The actual address in global memory 206, supplied on line 258, is the concatenation of the global pointer stored in register 208 and the index pointer stored in register 210, with the index pointer containing the 16 least significant address bits. Index pointer register 210 is updated by the FIFO control logic to be described in response to reads and writes to the FIFO.

In general, accesses to a FIFO from either the workstation 116 or the adapter bus 202 are made by addressing global memory 206 via address decoder 274, since the desired access is to the next read or write buffer location rather than a particular memory location as such. Each of FIFOs 250–256 exists to workstation 116 and to graphics processors 204 as either a unique address or (as described below) a unique range of addresses in the address space of the addressing unit. Address decoder 274 decodes the address signal supplied to it from workstation 116 or from adapter bus 202 and selects the FIFO within whose range the address falls. The FIFO pointers direct accesses to the desired location within a FIFO. Accesses to portions of global memory other than the FIFO areas are made via multiplexer 270, which provides undecoded address signals to global memory address line 272.

Figure 4:
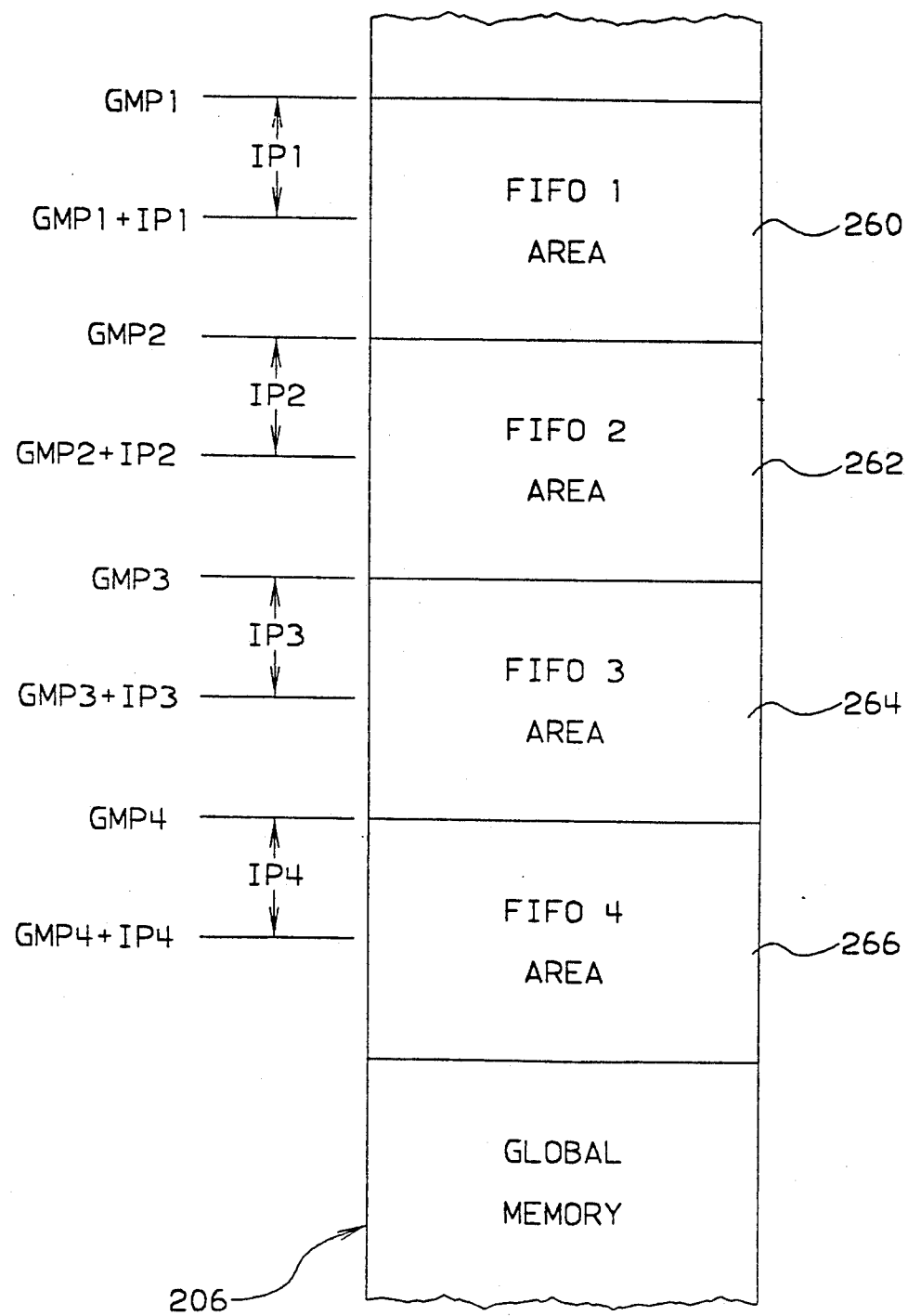
FIG. 4 is a diagram illustrating how the FIFO pointers point to locations in the global memory of the FIFO interface shown in FIG. 3.

FIG. 4 shows how the various global pointers and index pointers are used to define FIFO areas in global memory 206. It will be assumed for the purpose of this figure that the global pointer registers 208 of the respective FIFOs 250–256 store global pointers GMP1–GMP4, while the index pointer registers 210 corresponding to the same FIFOs store respective index pointers IP1–IP4. As shown in the figure, each global pointer (e.g. GMP1) points to the starting address of the corresponding FIFO area. As noted above, this starting address must, in the particular implementation shown, be an integral multiple of 64K. The index pointer for each FIFO (e.g. IP1) indicates the address of the next access by workstation 116 relative to the starting address defined by the global pointer. In FIG. 4, four consecutive FIFO areas 260, 262, 264 and 266 are shown. In the embodiment shown, this is implemented by storing global pointers in registers 208 that differ by 1 from those of adjacent FIFOs to point to adjacent 64K blocks.

Each FIFO in-use count register 212 holds a number representing the number of bytes of data in that FIFO. The required format of data in register 212 is changed by setting a transfer direction bit, to be described, in the corresponding control register 222. In the outbound (workstation-to-adapter) transfer mode the value stored is a number representing the number of bytes of data in that FIFO. In the inbound (adapter-to-workstation) transfer mode, the value stored is 64K (10000h in hexadecimal form) minus the number of bytes of data in the FIFO available to be read. For all operations, the FIFO in-use count register 212 is incremented every time the corresponding FIFO is accessed (written to or read) from the workstation side. Alteration of the content of the in-use count register 212 in response to accesses from the adapter side is effected by means of the add or subtract registers 224 and 226, in a manner to be described below.

Each high threshold register 214 stores a threshold that is compared with the content of the in-use count register 212 for that FIFO. An interrupt will occur (if enabled) when the in-use count register 212 indicates that there is an amount of data in the FIFO at least equal to the high threshold. This interrupt is sent to the central processor 102 in the workstation 116 via the I/O bus 108. As is described in more detail below, the threshold value that is stored in register 214 depends on the setting of the transfer direction bit in the corresponding control register 222. When the transfer direction bit is a 0, indicating an outbound data transfer from the workstation 116 to the graphics adapter 110, the stored value corresponds to the desired threshold. On the other hand, when the transfer direction bit is 1, indicating an inbound transfer from the graphics adapter 110 to the workstation 116, the stored value is 64K (assuming this is the size of the corresponding FIFO area in global memory 206) minus the desired value. An interrupt occurs after a workstation access to the FIFO or when the in-use count register 212 is updated from the adapter side by a write to the add register 224 or subtract register 226.

Each low threshold register 216 functions in a manner similar to that of the corresponding high threshold register 214. The value stored in register 216 defines a low threshold that is compared with the value stored in the in-use count register 212. An interrupt will occur (if enabled) when the in-use count register 212 indicates an amount of data in the FIFO equal to or less than the low threshold setting. This interrupt is sent to the workstation 116 in a manner similar to that of the high threshold interrupt. The value that is stored in register 216 depends on the setting of the transfer direction bit in the corresponding control register 222. When the transfer direction bit is 0, the value stored corresponds to the desired low threshold value. On the other hand, when the transfer direction bit is 1, the entered value is 64K minus the desired value, again assuming a FIFO area of this size in global memory 206. Like the high threshold interrupt, the low threshold interrupt occurs after a workstation access to the FIFO or when the in-use count register 212 is updated from the adapter side by a write to register 224 or 226.

Each high threshold interrupt enable register 218 and low threshold interrupt enable register 220 stores one bit. When the high threshold interrupt enable bit is set to 1, an interrupt will be sent to the workstation 116 when the amount of data in the corresponding FIFO is equal to or greater than the high threshold setting for that FIFO as stored in high threshold register 214. This bit allows a workstation process to enable or disable the high threshold interrupt from the corresponding FIFO. When set to a 1, an interrupt will be generated when the in-use count register 212 crosses the high threshold in such a way as to cause a status bit for that FIFO, stored in status register 232 (FIG. 3), to toggle from 0 to 1. Once the interrupt is cleared via a read of the portion of interrupt pending register 234 (FIG. 3) corresponding to that FIFO, no more interrupts will be generated until the condition exists again where the corresponding bit in status register 234 toggles from 0 to 1. This enable bit is reset when the high threshold interrupt is generated.

Each low threshold interrupt enable register 220 functions in a similar manner. When the low threshold interrupt enable register bit for a particular FIFO is set to a 1, an interrupt will be sent to the workstation 116 when the amount of data in the corresponding FIFO is less than or equal to the low threshold setting for that FIFO, as defined by the corresponding low threshold register 216. In a manner similar to that of the high threshold bit, this bit allows software to enable or disable the low threshold interrupt from the corresponding FIFO to the I/O bus 108. When set to a 1, an interrupt will be generated when the in-use count register 212 crosses the low threshold and then recrosses the same threshold. This is done to eliminate spurious low threshold interrupts before they are actually required. In other words, when a FIFO is being filled, it must be filled to above the low threshold, and then the interrupt will occur when enough data is removed to cross below the low threshold again. Once the interrupt is cleared via a read of the interrupt pending register 234, no more interrupts are generated until the condition exists again where the bit in status register 232 toggles from 0 to 1. This enable bit is reset when the low threshold interrupt is generated.

Each control register 222 stores four bits: a reset index register bit, a reset in-use count bit, a transfer direction bit, and a DMA suspend enable bit. When set to a 1, the reset index register bit clears the index pointer register 210 for the corresponding FIFO. Similarly, the reset in-use count register bit, when set to a 1, clears the corresponding in-use count register 212. The transfer direction bit, as noted above, indicates the direction of transfer between the workstation 116 and the graphics adapter 110. When set to a 1, the transfer direction bit indicates that the direction of data flow is from the graphics adapter 110, more particularly the graphics adapter bus 202, to the workstation 116. If the transfer direction bit is set to 0, the data flow is from the workstation 116 to the bus 202 of the graphics adapter 110. This mode bit is used within the FIFO interface 200 to reverse the function of the high and low threshold registers 214 and 216 and status register 232 insofar as they regulate the suspension and resumption of workstation processes or DMA access. These changes are transparent to the programmer when this bit is used.

The DMA suspend enable bit, when set to 1, suspends DMA to the corresponding FIFO when its in-use count register 212 reaches the high threshold value in the case of a data transfer from the workstation 116 (mode=0), or low threshold value in the case of a data transfer to the workstation 116 from the graphics adapter 110 (mode=1). DMA remains suspended until the in-use register 112 reaches the low threshold value in the case of a data transfer from the workstation 116 (mode=0) or high threshold value in the case of a data transfer to the workstation 116 from the graphics adapter 110 (mode=1). When this function is used, both the high and low threshold interrupt enable registers 218 and 220 for the particular FIFO are disabled by being set to 0.

FIFO add and subtract registers 226 are accessible from the graphics adapter bus 202 and are used to update the in-use count register 212 for the particular FIFO. Each time a FIFO transfer from the graphics adapter bus 202 to the workstation 116 is started, add register 224 is set to 64K (10000h), indicating an empty FIFO.

Subtract register 226 is used to indicate the number of bytes removed from the corresponding FIFO during a transfer from the workstation 116 to the graphics adapter bus 202 or the number of bytes transferred from the graphics adapter bus 202 into the corresponding FIFO during a data transfer in the other direction from the graphics adapter bus 202 to the workstation 116. These numbers are loaded into the subtract register 226 from the adapter bus 202 to decrement the in-use counter 212 by the number of bytes written to or read from the corresponding FIFO from the adapter bus side.

Registers 208, 214, 216, 218 and 220 may be written to or read by the workstation 116, as appropriate. Registers 210 and 212 may be read from but not written to. In addition, control register 222 may be written to by the workstation 116, while add and subtract registers 224 and 226 may, as noted above, be written to from the adapter bus 202.

Figure 5:
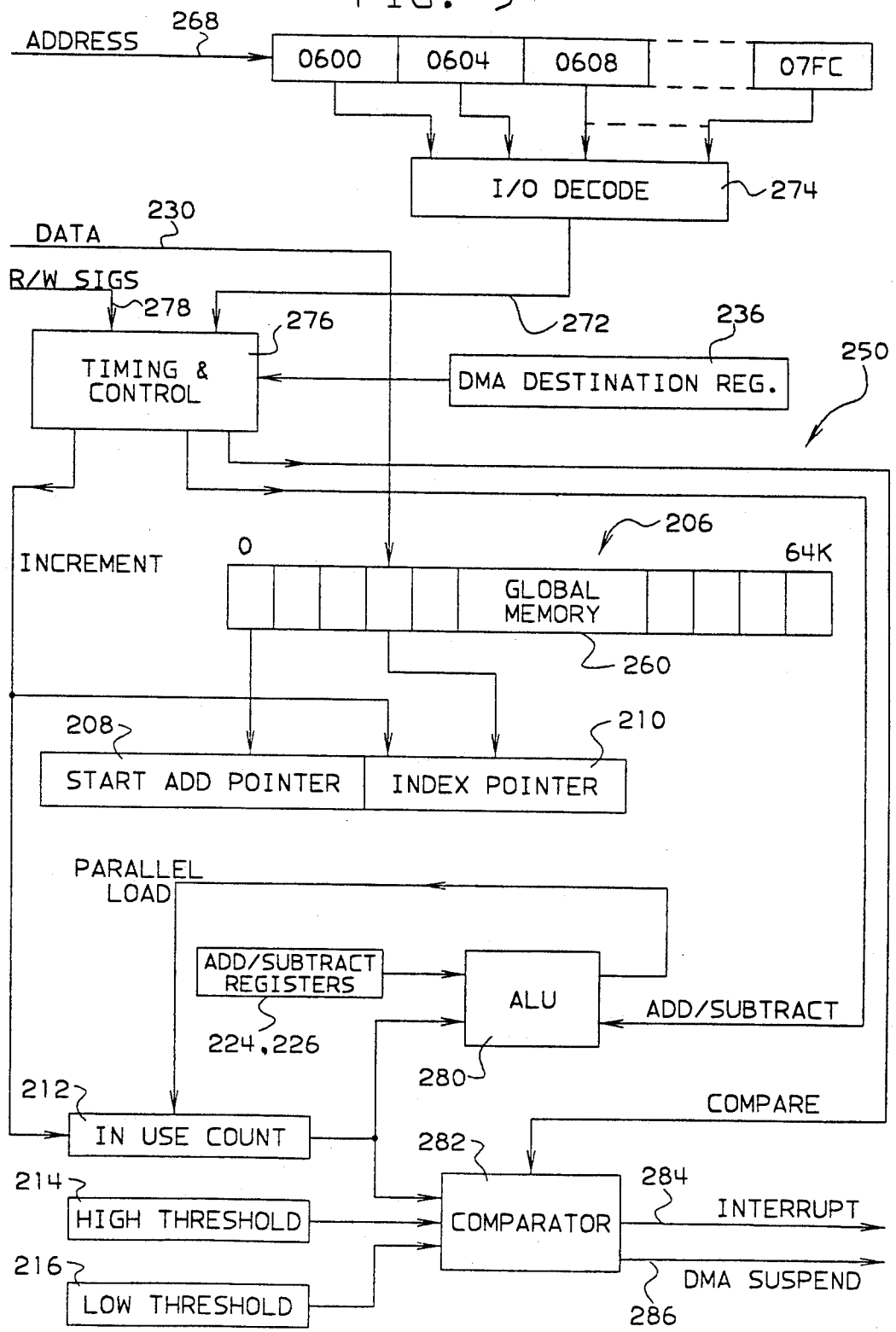
FIG. 5 is a schematic diagram of the elements associated with one of the FIFOs of the interface shown in FIG. 3.
Figure 6:
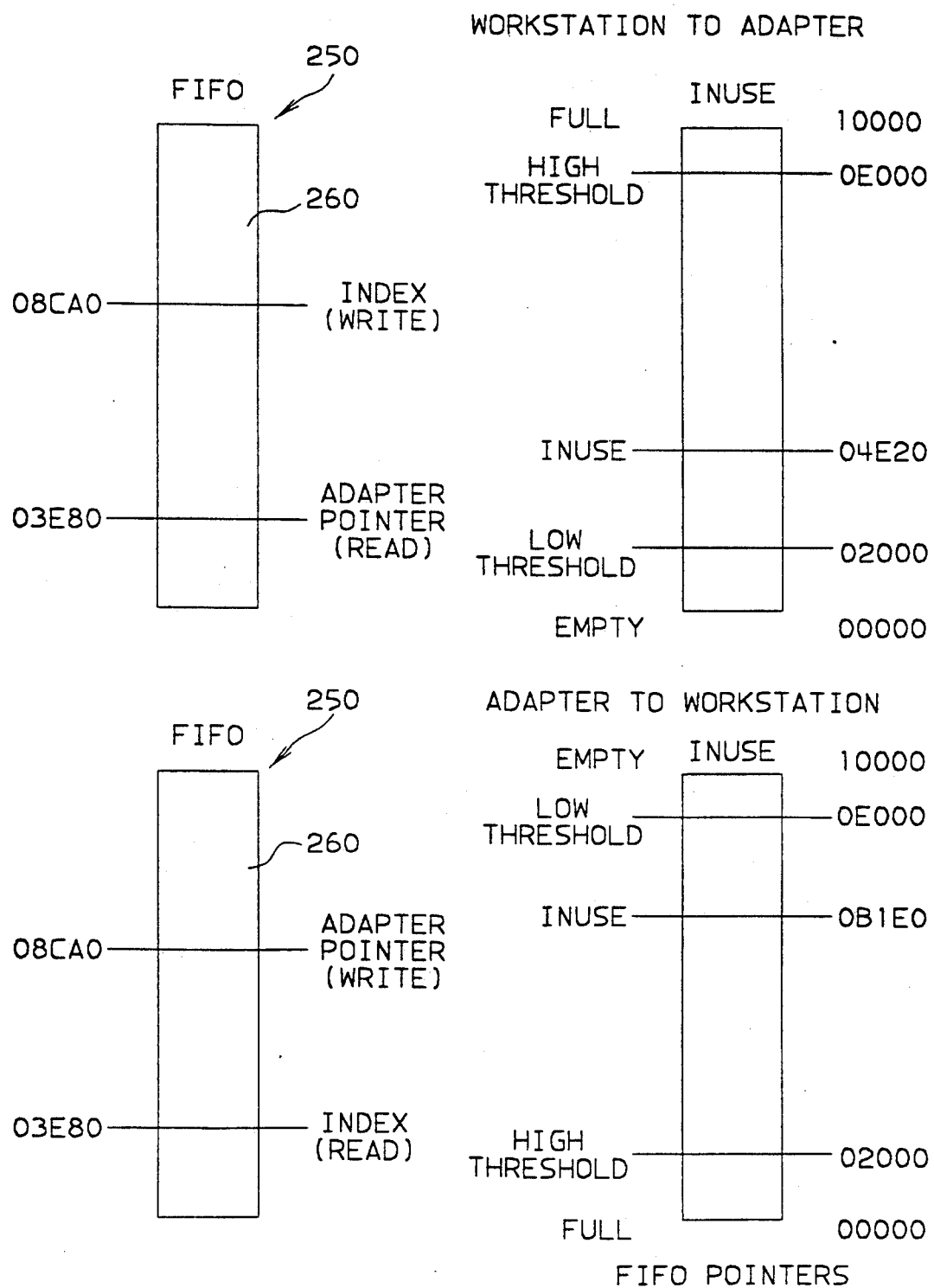
FIG. 6 is a diagram illustrating the functioning of the in-use counter and threshold registers in the various modes of data transfer of the FIFO shown in FIG. 5.

FIG. 5 shows in further detail the connections between the various registers of FIFO 250. The remaining FIFOs 252-256 are identical to FIFO 250. In this figure is shown the particular portion 260 of global memory 206 allocated to FIFO 250, as determined by the content of the global pointer register 208 (labeled "START ADD POINTER" in FIG. 5). Those elements in the figure below global memory portion 260 are unique to FIFO 250, while the elements in the upper portion of the figure are common to the four FIFOs 250-256.

As shown in FIG. 5, timing and control logic 276 (not shown in FIG. 3) is responsive to a decoded address signal supplied on line 272 from address decoder (labeled "I/O Decode" in FIG. 5) 274 and from DMA destination address register 236 as well as a read/write control signal on line 278 that originates ultimately from workstation 116. Timing and control logic 276 increments index pointer register 210 and in-use count register 212 as data is written to or read from global memory portion 260 by workstation 116. To update the in-use count register 212 as accesses are made from the graphics adapter bus 202, and to initialize the in-use count at 64K in the case of an inbound data transfer, an arithmetic logic unit (ALU) 280 is used. ALU 280 receives one input from in-use count register 212, an add input from add register 224 and a subtract input from subtract register 226. In response to an add/subtract signal from timing and control logic 276, ALU 280 either adds to the in-use count the value stored in add register 224 or subtracts from the count the value stored in subtract register 226 and stores the result in register 212, replacing its former contents.

Also shown in FIG. 5 is a comparator 282 receiving inputs from the in-use count register 212, high threshold register 214 and low threshold register 216 for FIFO 250. In response to a compare signal received from timing and control logic 276, comparator 282 compares the in-use count with the threshold stored in registers 214 and 216 to provide an interrupt output on line 284 or a DMA suspend output on line 286 in the case of a successful comparison.

Before FIFOs 250-256 are used, each of the global pointer registers 208 is programmed to point to a 64K block in global memory 206. The high and low threshold registers 214 and 216 are set to the selected values. The index pointer register 210 is initialized to zero at power up. The first FIFO access will be to the first location in the FIFO as pointed to by the global memory pointer stored in register 208 and the index pointer stored in register 210. For each access to the FIFO address range, the access will be to the memory location pointed to by the concatenation of these two pointers.

A range of FIFO addresses are used for each FIFO to allow an application running on the workstation 116 to write to a selected FIFO using Store Multiple instructions. The Store Multiple instruction stores the contents of internal registers (not separately shown) in workstation processor 102 at successively increasing addresses. Conversely, the Load Multiple instruction reads a block of data from the selected FIFO, also at selectively increasing addresses. Preferably, a range of 128 words are provided for each FIFO. Thus, as shown in FIG. 5, address decoder 274 selects FIFO 250 on receiving an address signal from workstation 116 within the range of 0600h to 07FCh. In system 100, addresses are reckoned in bytes of 8 bits, with 4 bytes in each 32-bit word This range has an extent (including the last but not first address) of 1FCh bytes, or 508 bytes in decimal notation, which corresponds in turn to an extent of 127 words, not counting the first address, or 128 words if the first address is included.

As a multitasking system, workstation 116 can have multiple processes running simultaneously. Each of these processes can access the adapter 110 directly. To aid the operating system, running on workstation processor 102, in maintaining the state of the adapter 110 for each process, two sets of control registers (not separately shown) exist in different pages of workstation memory 104. This allows two processes to access adapter 110 simultaneously without any operating system overhead. It also allows an application to use the adapter 110 while another FIFO is being taken away from a process set up for another.

FIFOs 250-256 can be accessed by workstation processor 102 directly by way of the four FIFO input address ranges, or by using the DMA controller 106 of workstation 116 for a DMA access. To perform a DMA access to a FIFO, DMA destination address register 236 (FIGS. 2 and 3) is loaded with an address within the appropriate range to access the correct FIFO. Pacing of DMA accesses to the FIFO are controlled as described below.

Whenever an access is made to one of the FIFO address ranges from workstation 116, timing and control logic 276 (FIG. 3) sends out a pulse to increment the corresponding index pointer register 210 and in-use count register 212. Timing and control logic 276 then sends out a pulse to perform a compare operation, which compares the in-use count stored in register 212 with the high and low threshold values stored in registers 214 and 216. Index pointer register 210 always points to the next location in global memory at the completion of any cycle. The in-use count stored in register 212 is also updated automatically during any adapter access to the FIFO.

Data flows from workstation 116 directly to the appropriate memory location as pointed to by the concatenation of the global pointer stored in register 208 and index pointer stored in register 210. The index pointer is incremented appropriately for byte (8 bits), half-word (16 bits) and word accesses. When a FIFO is accessed from the adapter bus 202, the in-use count register is updated by graphics processor microcode by way of add and subtract registers 224 and 226.

During DMA writes to a FIFO, all FIFO interrupts are suspended. Control or pacing of the data writes is done by an added control signal (line 286 in FIG. 5) to the bus interface 109. A high threshold status signal is gated into bus interface logic 109, which temporarily suspends DMA. Data is then removed from the FIFO by adapter 110 in the normal manner. DMA is restarted when enough data is removed from the FIFO that the state of low threshold status changes. Likewise, during DMA reads from a FIFO, all FIFO interrupts are again suspended. Control or pacing of the data reads is done by the same control signal to the bus interface 109. A low threshold status signal is gated into bus interface logic 109, which temporarily suspends DMA. Data is then added to the FIFO from the adapter bus 202 in the normal manner. DMA is restarted when enough data is added to the FIFO that the state of high threshold status changes. This pacing feature thus allows DMA accesses to the FIFO in either direction with no software intervention.

For a transfer of data from the workstation 116 to the graphics adapter 110 (more particularly, to the graphics adapter bus 202), the FIFO to be used for that transfer is initialized by writing to the corresponding FIFO control register 222, setting the transfer direction bit to 0, indicating an outbound data transfer, and clearing the index pointer register 210 and in-use count register 212. As noted above, the index pointer stored in register 210 concatenated with the global memory pointer stored in register 208 indicates the location in global memory 206 for the next write to the FIFO. As also noted above, in-use count register 210 indicates the number of bytes to be read from the FIFO. An in-use count of 00000h indicates a FIFO empty condition, while a count of 10000h indicates a full FIFO condition. The low threshold register 216 for that FIFO is set to the number of bytes desired to generate a low threshold interrupt, while the corresponding high threshold register 214 is set to the number of bytes desired to generate a high threshold interrupt. Workstation 116 writes data to the selected FIFO via a write to the FIFO range for that FIFO. After each write to the FIFO, both the index pointer register 210 and the in-use count register 212 are appropriately incremented. The graphics adapter bus 202 (more particularly, a graphics processor 204 coupled to the bus 202) reads the data in the FIFO directly from global memory 206 using its own read/write pointer, which is either stored in local memory (not separately shown) associated with the graphics processor 204 or calculated from the values stored in the index pointer register 210 and in-use count register 212 for that FIFO The graphics processor 204 attached to bus 202 then updates the in-use count register 212 for that FIFO by writing to the subtract register 226 to indicate the number of bytes read.

When transferring data in the opposite direction, from the graphics adapter bus 202 to the workstation 116 via I/O bus 108, the selected FIFO is initialized by first writing to the corresponding FIFO control register 222, setting the transfer direction bit to 1 to indicate an inbound data transfer and clearing the corresponding index pointer register 210 and in-use count register 212. After it has been cleared, the in-use count register 212 is loaded with the value 64K by loading this value in the corresponding add register 224. The index pointer stored in register 210 concatenated with the global memory pointer stored in FIFO register 208 now indicates the location in global memory 206 for the next read of the FIFO by the workstation 116. In the inbound transfer mode, in contrast to the outbound transfer mode, an in-use count of 10000h stored in register 212 indicates a FIFO empty condition and count of 00000h indicates a full FIFO condition. The number of bytes remaining to be read from the FIFO can be found by subtracting the value stored in in-use count register 212 from 64K (10000h). The low threshold register 216 for the selected FIFO is set to 10000h (64K) minus the number of bytes desired to generate a low threshold interrupt, while the high threshold register 214 is set to 10000h (64K) minus the number of bytes desired to generate a high threshold interrupt. A graphics processor 204 attached to the graphics adapter bus 202 writes data for the FIFO directly into global memory 206 using the same read/write pointer which, as noted above, may either be stored in local memory (not separately shown) associated with the graphics processor or calculated from the values stored in index pointer register 210 and in-use count register 212. The graphics processor 204 then updates the in-use count register 212 by again writing to the subtract register 226, this time indicating the number of bytes written. The workstation 116 reads data from the FIFO via a read of the FIFO range from that FIFO. After each read from the FIFO, both the index pointer register 210 and the in-use count register 212 for that FIFO are automatically incremented.

In both the outbound and inbound modes of data transfer, the contents of the low and high threshold registers 216 and 214 are continually compared with those of the in-use count register 212 for the same FIFO, and the portion of status register 232 allocated to that FIFO is updated after an access to the FIFO range or to any of registers 212, 214, 216, 222, 224 or 226.

In system 100, the software overhead of accessing FIFOs 250-256 is minimized through the use of high and low threshold interrupts. These interrupts allow processes running on the workstation processor 102 to write data to a FIFO without first having to query the adapter 110 to determine whether there is enough room. As data is written from the workstation 116 to the adapter 110, the FIFO fills. As the data is processed by the adapter 110, the FIFO empties as indicated by the in-use count Whenever the amount of data in the FIFO exceeds the high threshold, a high interrupt is generated. Likewise whenever the amount of data goes below the low threshold, a low interrupt is generated. These interrupts are handled by an independent process running on the workstation processor 102, called an interrupt handler, which is invoked whenever an interrupt is generated by the adapter 110. By properly maintaining the threshold values and enables, the interrupt handler can stop and start the application writing to the FIFO without the application being aware of it. All together, these controls allow applications to transfer data blindly to a FIFO, but automatically stop executing when there is no more room in the FIFO. This lets other tasks be performed in the system. The application will automatically start executing again when room is available in the FIFO.

When an application running on workstation processor 102 is about to write to one of the FIFOs 250-256, it registers itself with the interrupt handler via a system call. This lets the interrupt handler know which process to start and stop, and prevents other applications from using the FIFO until this one is done with it. After registering itself with the interrupt handler, the application is free to access the FIFO.

When high and low threshold interrupts occur, care must be taken to prevent rapid-fire interrupts from occurring as the data in the FIFO fluctuates across a threshold. Care must also be taken to ensure that any stopped applications will be started. These problems are solved jointly by the hardware and the interrupt handler.

Initially, a FIFO is set up with the high threshold enabled and the low threshold disabled. As data is written to the FIFO from the workstation 116, the hardware described above moves the data into global memory 206 and increments the corresponding in-use count register 212. When a graphics processor 204 (more particularly, a process running on that processor) detects data in the FIFO, it reads the data and decrements the in-use count register 212 via subtract register 226. If the workstation 116 writes enough data to the FIFO for the in-use count to exceed the high threshold, a high threshold interrupt is generated and, at the same time, the high threshold is disabled to prevent further high threshold interrupts from occurring. At this point, both the high and low thresholds are disabled. The interrupt handler now processes the interrupt, paces the writing application, and ensures that the high and low thresholds for the FIFO are put into the proper state of enablement for the system to continue running. By enabling the low interrupt threshold and stopping the application, the workstation processor 116 becomes available for performing other tasks while the adapter 110 processes the data in the FIFO. When it decrements the in-use count stored in register 212 so that it is less than the low threshold, a low threshold interrupt is generated, and the low threshold is automatically disabled to prevent subsequent interrupts.

Summarizing the above, on outbound transfers from the workstation 116 to the adapter 116, the FIFO generates a high threshold interrupt (if enabled) if the in-use count stored in register 212 reaches or exceeds the high threshold stored in register 214 and generates a low threshold interrupt (if enabled) if the in-use count reaches or goes below the low threshold stored in register 216. The interrupt handler running on the workstation processor 102 responds to a high threshold interrupt by suspending the writing application, disabling the high threshold interrupt by writing to high threshold interrupt enable register 218, and enabling the low threshold interrupt by writing to low threshold interrupt enable register 220. The interrupt handler responds to a low threshold interrupt by resuming the writing application, disabling the low threshold interrupt by writing to low threshold interrupt enable register 220, and enabling the high threshold interrupt by writing to high threshold interrupt enable register 218.

On inbound transfers from the adapter 110 to the workstation 110, the FIFO generates a high threshold interrupt (if enabled) if the in-use count stored in register 212 reaches or goes below the high threshold stored in register 214 and generates a low threshold interrupt (if enabled) if the in-use count reaches or exceeds the low threshold stored in register 216. (As already noted, on inbound transfers the counts have an inverted significance.) The interrupt handler running on the workstation processor 102 responds to a low threshold interrupt by suspending the reading application, disabling the low threshold interrupt by writing to low threshold interrupt enable register 220, and enabling the high threshold interrupt by writing to high threshold interrupt enable register 218. The interrupt handler responds to a high threshold interrupt by resuming the reading application, disabling the high threshold interrupt by writing to high threshold interrupt enable register 218, and enabling the high threshold interrupt by writing to high threshold interrupt enable register 220.

Through the use of automatic threshold disabling and predefined interrupt enabling as described above, required access to and manipulation of the graphics adapter 110 and processing path length are greatly minimized during interrupts. Furthermore, automatic starting and stopping of an application minimizes software overhead for accessing the FIFO and improves the utilization of the workstation processor 102.

Some graphics operations require data to be read from the adapter 110 and put into workstation memory 104. To accommodate this, the graphics adapter FIFOs 250-256 are, as noted above, bidirectional and can move data in either direction between the workstation 116 and the graphics adapter 110. The provision of multiple FIFOs permits the handling of graphical commands separately from graphical data. Separating the commands from the data in the manner allows two graphics adapter processors 204 to work in parallel. Thus, one processor can be processing the graphical data of a particular command from the data FIFO, while the other processor is working on the next command in the command FIFO. When graphical data is written to the adapter 110 from the workstation 116, FIFOs 250-256 operate as described above in the preceding paragraphs. However when data is to be read from the adapter 110, it becomes necessary to resynchronize the workstation 116 and adapter 110, transfer the data, and return the FIFO to the normal state for writing to the adapter 110.

When an application running on the workstation processor 102 has to perform a graphical operation that requires reading data from the adapter 110, it writes an appropriate command into the command FIFO. Since the application cannot know if the command has been processed yet, it calls the adapter device driver (a process running concurrently on the workstation processor 102) and requests that it (i.e. the application) be stopped in the same fashion that an application would be stopped after a high threshold interrupt. When the "read" command is processed by the adapter 110, the process running on the adapter processor 204 that will put data into the data FIFO sets the FIFO's in-use count to its maximum value, causing a high threshold interrupt. However, since the original application is already asleep, the interrupt handler merely changes the threshold enables so that the low threshold interrupt is enabled. As the adapter 110 moves the data into the FIFO, it decrements the in-use count. While this reverses the actual meaning of the count, it serves to use the existing controls and interrupt logic to achieve maximum throughput and minimum overhead.

When the in-use count falls below the low threshold, a low threshold interrupt is generated. (In this particular mode of operation, the transfer direction bit in the control register 222 of the data FIFO remains at 0, hence the usual significance of the low threshold, even though the transfer direction is inbound). As in the case of a low threshold interrupt during a write operation, the interrupt handler wakes up the stopped application, enables the high threshold interrupt, and lets the workstation and adapter processors 102 and 204 work in parallel As the workstation 116 reads data from the FIFO, the FIFO hardware increments the in-use count. As the adapter 110 puts data into the FIFO, the in-use count is decremented. If the adapter 110 fills the FIFO, it stops and waits for more room. If the application reads enough data for the in-use count to exceed the high threshold, the interrupt handler stops the application, enables the low threshold and lets other tasks be performed until the data becomes available. When the adapter 110 finishes the operation, a "read data finish" interrupt is generated. There are two conditions under which this interrupt will occur: one is that the application is stopped, waiting for a low threshold interrupt to restart it; the other is that the application is running, expecting a high threshold interrupt to stop it or expecting to finish reading the data.

If the application is stopped, the "read data finished" interrupt will cause the interrupt handler to restart it. The FIFO thresholds are left with the low threshold enabled. The application will then run until all of the data is read. This leaves the in-use count at its maximum value. To put the FIFO into its usual "write data" state, the application sets the in-use count to its minimum value. This causes a low threshold interrupt to be generated. As in all low threshold interrupts, the interrupt handler enables the high threshold, but, since the application is already running, it does not have to be started. The adapter 110 is now in its usual "write data" state.

If the application was running at the time of the "read data finished" interrupt, the interrupt handler would disable the high threshold interrupt, enable the low threshold interrupt, and return. The operation proceeds in the same fashion as when the application was asleep and restarted by the "read data finished" interrupt.

When managing the shared use of the graphics adapter 110 among multiple applications, the operating system for the workstation 116, which also runs on the workstation processor 102, must itself access the adapter. As described above, FIFOs 250-256 control applications via the high and low threshold interrupts. When the adapter 110 is taken from one process and given to another, the current state of the adapter is saved and the state changed to how the other process had it the last time it was running. Through the use of hardware-maintained FIFO controls, the operating system can turn off the threshold interrupts, keeping the application quiet, and access a FIFO itself. The operating system need only poll the FIFO in-use count stored in register 212 to ensure that enough room exists in the FIFO. When the operating system has finished accessing the adapter 110, the threshold interrupts are reenabled and the applications permitted to run. Together, the threshold interrupts are used to control the applications accessing the adapter 110; the hardware-maintained pointers and counters allow the operating system to access a FIFO without the application knowing it.

What is claimed is:

1. Apparatus for controlling a FIFO buffer to transfer data in a selected direction between a first line and a second line, said buffer having a first transfer mode in which data is transferred from said first line to said second line and a second transfer mode in which data is transferred from said second line to said first line, comprising:

means for storing a buffer count indicating the amount of data in said buffer, said count ranging between a minimum count and a maximum count;

means for initializing said buffer count in accordance with said transfer mode, said buffer count being initialized at said minimum count in said first transfer mode and being initialized at said maximum count in said second transfer mode;

means for incrementing said count in either of said modes in response to the transfer of data between said first line and said buffer; and means for decrementing said count in either of said modes in response to the transfer of data between said second line and said buffer.

2. A method of controlling a FIFO buffer to transfer data in a selected direction between a first line and a second line, said buffer having a first transfer mode in which data is transferred from said first line to said second line and a second transfer mode in which data is transferred from said second line to said first line, comprising the steps of:

storing a buffer count indicating the amount of data in said buffer, said count ranging between a minimum count and a maximum count;

initializing said buffer count in accordance with said transfer mode, said buffer count being initialized at said minimum count in said first transfer mode and being initialized at said maximum count in said second transfer mode;

incrementing said count in either of said modes in response to the transfer of data between said first line and said buffer; and decrementing said count in either of said modes in response to the transfer of data between said second line and said buffer.

3. Apparatus for controlling the transfer of data between first and second processors via a FIFO buffer comprising:

means for generating a count indicating the amount of data currently in said buffer;

means for suspending the transfer of data between said first processor and said buffer in response to the determination of a predetermined relation between said count and a first threshold; and means for resuming said transfer between said first processor and said buffer in response to the determination of a predetermined relation between said count and a second threshold.

4. Apparatus as in claim 3 in which said transfer of data is from said first processor to said buffer, said first threshold being a high threshold and said second threshold being a low threshold.

5. Apparatus as in claim 3 in which said transfer of data is from said buffer to said first processor, said first threshold being a low threshold and said second threshold being a high threshold.

6. Apparatus as in claim 3 in which said first processor is a DMA controller.

7. Apparatus as in claim 3 in which said first processor is a central processor.

8. Apparatus as in claim 3 in which said suspending means generates a first interrupt signal and said resuming means generates a second interrupt signal.

9. A method of controlling the transfer of data between first and second processors via a FIFO buffer comprising the steps of:

generating a count indicating the amount of data currently in said buffer;

suspending the transfer of data between said first processor and said buffer in response to the determination of a predetermined relation between said count and a first threshold; and resuming said transfer between said first processor and said buffer in response to the determination of a predetermined relation between said count and a second threshold.

10. A method as in claim 9 in which said transfer of data is from said first processor to said buffer, said first threshold being a high threshold and said second threshold being a low threshold.

11. A method as in claim 9 in which said transfer of data is from said buffer to said first processor, said first threshold being a low threshold and said second threshold being a high threshold.

12. Apparatus for controlling the transfer of data between first and second processors, said first processor generating an address signal indicating an address within a predetermined address space, said apparatus comprising:

a FIFO buffer having a plurality of storage locations, said buffer having assigned thereto a predetermined range of addresses within said address space;

means for coupling said buffer to said second processor;

means for defining the storage location within said buffer for a next access by said first processor; and means responsive to an address signal within said predetermined range for accessing said buffer at said defined location.

13. Apparatus as in claim 12 in which said first processor generates a data signal with said address signal, said accessing means storing said data signal in said buffer at said defined location.

14. Apparatus as in claim 12 comprising a plurality of FIFO buffers, each of which has a plurality of unique storage locations and has assigned thereto a unique range of addresses within said address space, means for defining the storage location within each of said buffers for a next access by said first processor, said accessing means being responsive to an address signal within the address range of one of said buffers for selecting said buffer and for accessing said selected buffer at said defined location.

* * * * *